US 8,165,559 B1

(12) United States Patent
Klesper et al.

(10) Patent No.: US 8,165,559 B1
(45) Date of Patent: Apr. 24, 2012

(54) DYNAMIC ACCESS MODE DETERMINATION FOR EMERGENCY SERVICE CALLS

(75) Inventors: Stevan Klesper, Gardner, KS (US); Stephen Williams, Olathe, KS (US); Kevin McGinnis, Overland Park, KS (US); Arun Santharam, Olathe, KS (US); Dan Durig, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 948 days.

(21) Appl. No.: 11/434,844

(22) Filed: May 16, 2006

(51) Int. Cl.
*H04M 11/04* (2006.01)
*H04M 1/00* (2006.01)
*H04W 72/00* (2009.01)

(52) U.S. Cl. .................... 455/404.1; 455/521; 455/450; 379/37

(58) Field of Classification Search ............... 455/404.1, 455/450, 521; 379/37–51
See application file for complete search history.

(56) References Cited

U.S. PATENT DOCUMENTS

| 6,240,285 | B1 | 5/2001 | Blum et al. |
| 2003/0220116 | A1* | 11/2003 | Sagefalk et al. ........... 455/456.1 |
| 2006/0114871 | A1* | 6/2006 | Buckley et al. ............... 370/338 |
| 2007/0142028 | A1* | 6/2007 | Ayoub et al. ............... 455/404.1 |
| 2007/0232307 | A1* | 10/2007 | Ibrahim et al. ............... 455/436 |

* cited by examiner

*Primary Examiner* — Erika Gary
*Assistant Examiner* — Michael Mapa (57) ABSTRACT

A call system comprising an interface system configured to receive a call request, and a processing system coupled to the interface system and configured operate in a current mode of a plurality of modes, to determine if the call is for an emergency service while in the current mode, if the call is for the emergency service determine a preferred mode for the call from a one of the plurality of modes, and initiate the call in the preferred mode.

22 Claims, 6 Drawing Sheets

DYNAMIC ACCESS MODE DETERMINATION FOR EMERGENCY SERVICE CALLS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to telecommunication technologies, and in particular, to emergency service call handling and provisioning technologies.

2. Description of the Prior Art

In the past, wireless telecommunication services were commonly provided over dedicated access systems, such as TDMA, CDMA, and GSM networks. Over time, robust emergency service capabilities were integrated into the aforementioned dedicated access systems. For instance, when an end user dials 911 using a wireless handset, the user can be reliably connected through a dedicated access system to a public service answering point (PSAP). Other emergency services, such as call back number provisioning and location determination services, are also provided to users communicating over dedicated access systems.

Recently, telecommunication carriers and providers have begun to offer services over open access systems, such as WiFi and WiMax. Open access systems are typically designed for general purpose data access. For example, users often times gain Internet connectivity via WiFi access. Users can then utilize applications that run on top of the data or network connection. Thus, a voice application such as Voice over Internet Protocol (VoIP) calling is just one application among many that run over open access systems.

In contrast, dedicated access systems are designed primarily for voice communication services. Although many dedicated access systems now support data services, voice service remains the main focus of most dedicated access systems. As a result, voice service provided over dedicated access systems is generally more reliable and of a higher quality than voice service provided over open access systems.

In another recent development, telecommunication service providers have begun to offer dual-mode handsets that are capable of accessing voice services over both dedicated access systems and open access systems. For example, a dual-mode handset can be configured to communicate with a CDMA network when outside the home, yet switch to communicating with a WiFi network when inside the home.

One drawback to current dual-mode access capabilities is that many service providers lack the ability to provide robust emergency call services to users placing emergency calls over open access systems. For example, location determination services and call back number provisioning for calls over open access systems are less reliable than for calls placed over dedicated access systems. While many handsets contain global positioning functionality, users oftentimes turn-off such features. In addition, the general call quality and reliability of open access calls are less than those placed over dedicated access systems. Due to the fact that a large number of emergency service calls are placed from within a home or enterprise, it is crucial that dual-mode handset users have access to high quality and highly reliable emergency call services.

SUMMARY OF THE INVENTION

An embodiment of the invention helps solve the above problems and other problems by providing a call system and method capable of determining a preferred mode of access or operation for an emergency service call prior to initiating the call when multiple modes could be available for the call. In such a manner, the best mode of access or operation can be provided for the call, rather than relegating a call to substandard service due to a default or current operating mode. As a result, emergency services, such as location determination capabilities, are improved.

In an embodiment of the invention, a call system comprises an interface system configured to receive a call request and a processing system coupled to the interface system and configured operate in a current mode of a plurality of modes, to determine if the call is for an emergency service while in the current mode, if the call is for the emergency service determine a preferred mode for the call from a one of the plurality of modes, and initiate the call in the preferred mode.

In an embodiment of the invention, the processing system is configured to change the current mode to the preferred mode if the current mode is not the preferred mode.

In an embodiment of the invention, the processing system is configured to determine the preferred mode based on whether location services are available for the call in the current mode.

In an embodiment of the invention, the processing system is configured to determine if the preferred mode is available and wherein the processing system is configured to remain in the current mode and initiate the call in the current mode if the preferred mode is not available.

In an embodiment of the invention, the emergency service comprises 911 service.

In an embodiment of the invention, the plurality of modes comprises an open access mode and a dedicated access mode.

In an embodiment of the invention, the open access mode comprises a Wi-fi mode.

In an embodiment of the invention, the dedicated access mode comprises a cellular access mode.

In an embodiment of the invention, the cellular access mode comprises a code division multiple access (CDMA) mode.

In an embodiment of the invention, the cellular access mode comprises a global service mobile (GSM) access mode.

In an embodiment of the invention, a method of operating a call system comprises receiving a call request in a current mode of a plurality of modes, determining if the call is for an emergency service while in the current mode, if the call is for the emergency service determining a preferred mode for the call from a one of the plurality of modes; and initiating the call in the preferred mode.

BRIEF DESCRIPTION OF THE DRAWINGS

The same reference number represents the same element on all drawings.

DETAILED DESCRIPTION OF THE PREFERRED EMBODIMENT

FIGS. 1-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
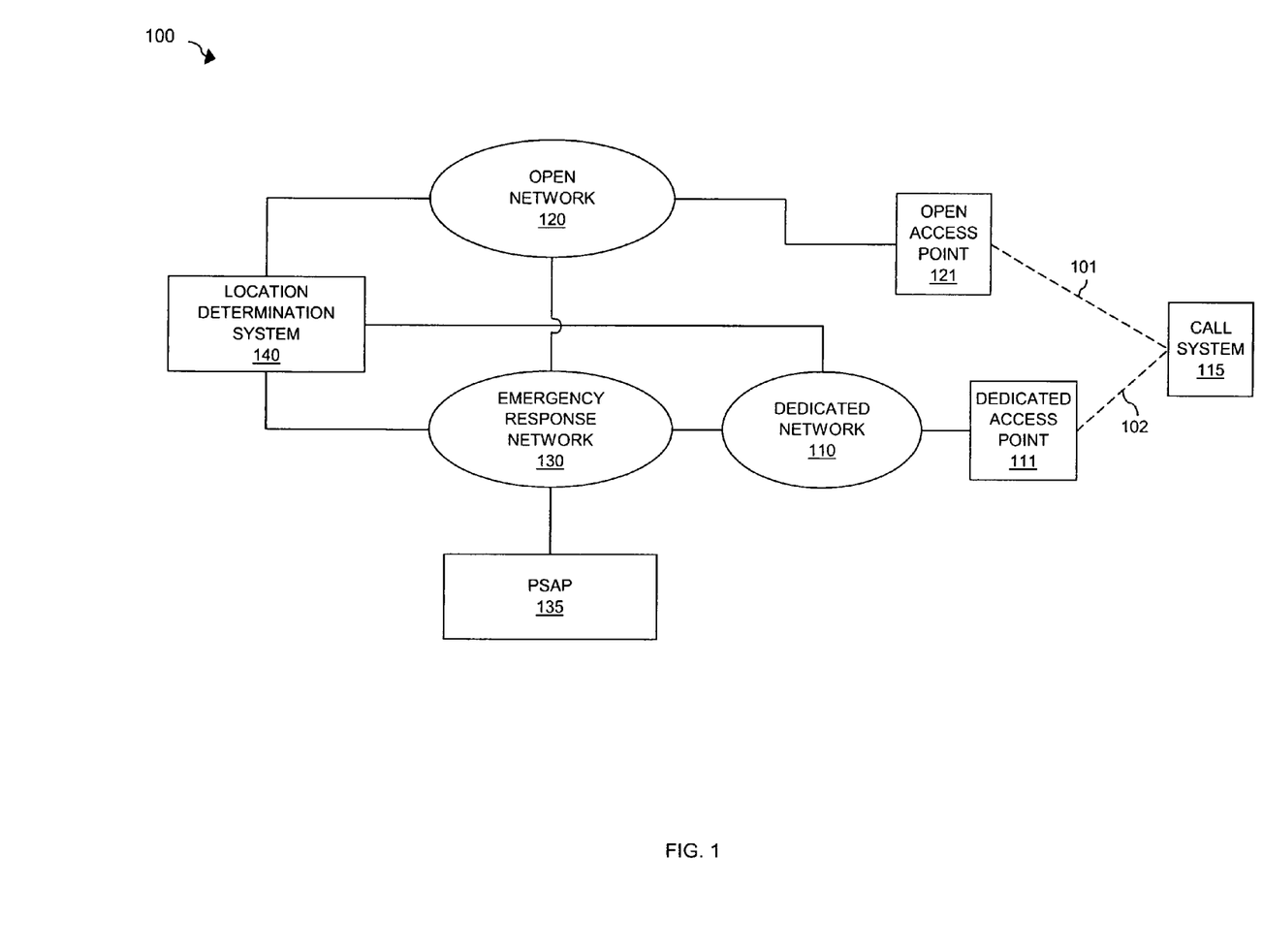
FIG. 1 illustrates a communication network in an embodiment of the invention.

FIG. 1 illustrates communication network 100 in an embodiment of the invention. Communication network 100 includes call system 115 in communication with open access point 121 over open access link 101. Call system 115 is also in communication with dedicated access point 111 over dedicated access link 102. Access links 101 and 102 could be wireless links. Open access point 121 is operatively coupled to open network 120. Dedicated access point 111 is operatively coupled to dedicated network 110. Open network 120 is operatively coupled to emergency response network 130 and location determination system 140. Similarly, dedicated network 110 is operatively coupled to emergency response network 130 and location determination system 140. Emergency response network 130 is operatively coupled to public safety answering point (PSAP) 135 and location determination system 140.

Call system 115 could be any system or collection of systems capable operating in multiple modes. In an open access mode, call system 115 could be capable of placing voice calls over open network 120. In a dedicated access mode, call system 115 could be capable of placing calls over dedicated network 110. Open access point 121 could be any access system capable of interfacing between call system 115 and open network 120. Dedicated access point 111 could be any access system capable of interfacing between call system 115 and dedicated network 110. Call system 115 could include an interface system for receiving user inputs, as well as for interfacing with open access point 121 and dedicated access point 111. Call system 115 could also include a processing system capable of performing call processing functions. It should be appreciated that call systems are well known in the art.

Open network 120 could be any service network capable of providing call services to call system 115 through open access point 121. In addition, open network 120 could be any service network capable of terminating emergency service calls from call system 115 to emergency response network 130. Open network 120 could also be capable of interfacing with location determination system 140 to provide the geographic location of call system 115 to emergency response network 130, an in turn, PSAP 135. It should be understood that open network 120 and dedicated network 110 could operate separately to terminate emergency service calls to emergency response network 130. However, open network 120 and dedicated network 110 could operate in a tandem or cooperative manner to handle emergency service calls.

Likewise, dedicated network 110 could be any network capable of providing call services to call system 115 through dedicated access point 111. In addition, dedicated network 110 could be capable of terminating emergency service calls from call system 115 to emergency response network 130. Dedicated network 110 could also be capable of interfacing with location determination system 140 to determine and provide the geographic location of call system 115 to emergency response network 130 and PSAP 135.

Emergency response network 130 could be any network or collection of networks capable of interfacing with open network 120 and dedicated network 110 to terminate emergency service calls to PSAP 135. In addition, emergency response network 130 could be capable of interfacing with location determination system 140 to provide the geographic location of call system 115 to PSAP 135. Location determination system 140 could be any system or collection of systems capable of determining the geographic location of a call.

Figure 2:
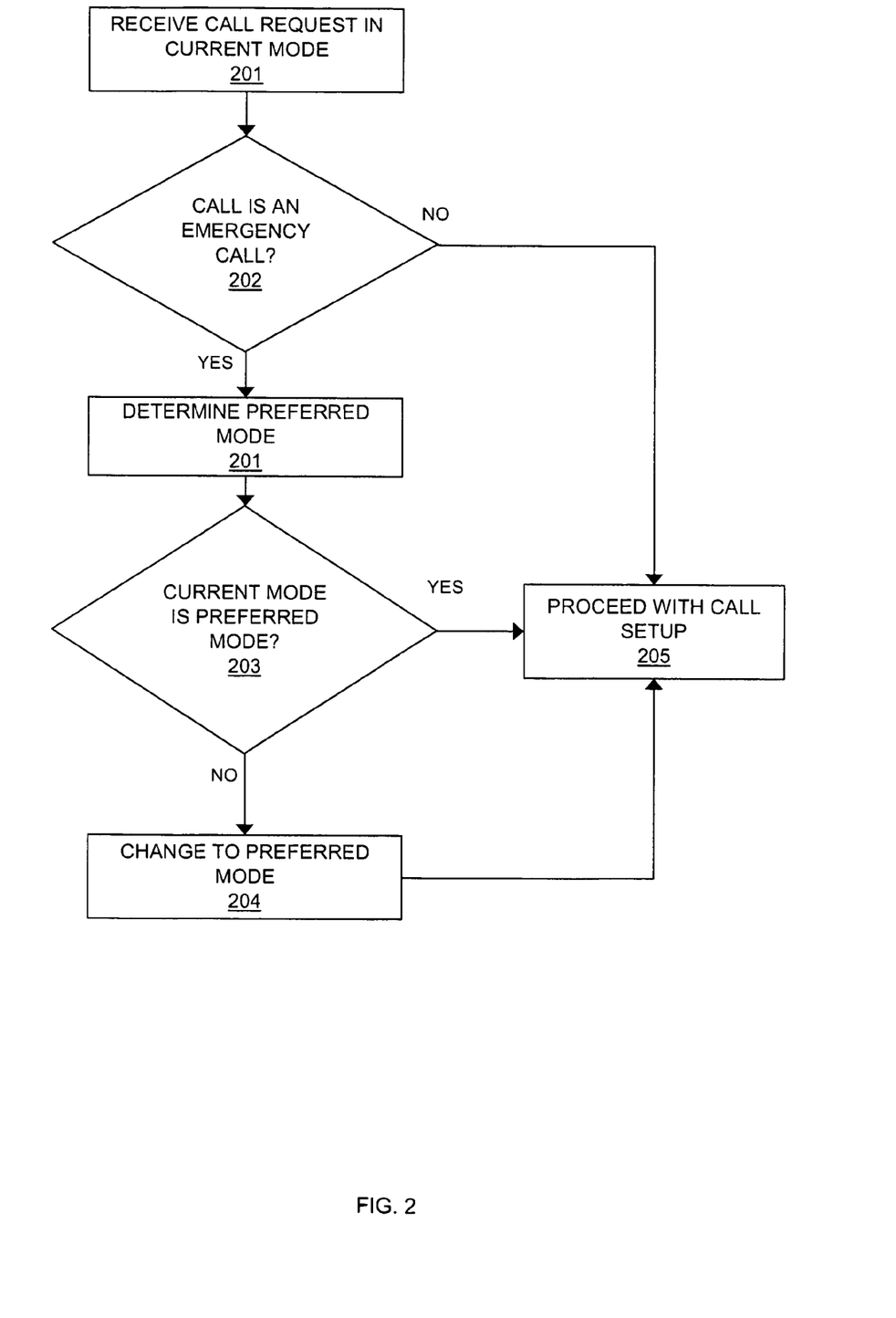
FIG. 2 illustrates the operation of a call system in an embodiment of the invention.

FIG. 2 illustrates the operation of call system 115 in an embodiment of the invention. To begin, call system 115 receives a call request for a call while operating in a current mode of either the open access mode or the dedicated access mode (Step 201). The call request could be, for example, a user input. Examples of user inputs include dialed numbers, graphic selections, quick buttons, or the like.

Continuing with FIG. 2, call system 115 processes the call request to determine if the call is an emergency service call (Step 202). Whether a call is an emergency service call could be indicated in the call request, such as by a digit string. An example is 911. An emergency service could also be indicated by other dialed numbers, such as a 7 or 10 digit dialing code, as well as by graphic selections, quick buttons, or the like.

If the call is an emergency service call, call system 115 determines the preferred mode for the call (Step 201). For instance, the preferred mode could be either the open access mode or the dedicated access mode.

Next, call system 115 determines if the current mode is the same mode as the preferred mode (Step 203). If so, call system 115 proceeds with call setup for the call while operating in the current mode (Step 205), including initiating the call to either open network 120 or dedicated network 110. If the current mode is not the same mode as the preferred mode, call system 115 changes the current mode of operation to the preferred mode (Step 204) and then initiates the call in the preferred mode (Step 205).

Once the call has been initiated from call system 115, either open network 120 or dedicated network 110 routes the call to emergency response network 130. It should also be understood that open network 120 or dedicated network 110 communicates with location determination system 140 to provide the geographic location of call system 115 to emergency response network 130. In response, emergency response network 130 selects the appropriate PSAP for the call, which in this example is illustrated as PSAP 135, and routes the all to the selected PSAP. In addition, geographic location information is provided to PSAP 135 for call system 115. It should be understood that the geographic location information could be a key used by PSAP 135 to query location determination system 140 for the actual geographic information for a particular call. Other variations of providing location information to PSAP 135 are possible.

Advantageously, communication network 100 provides for a call system determining a preferred access mode of operation for an emergency service call, rather than placing the call over in a default of current mode when the current mode could be deficient. In this manner, user can enjoy high quality emergency call services, such as location determination services, without the burden of manually changing the mode of operation of a call system.

Figure 3:
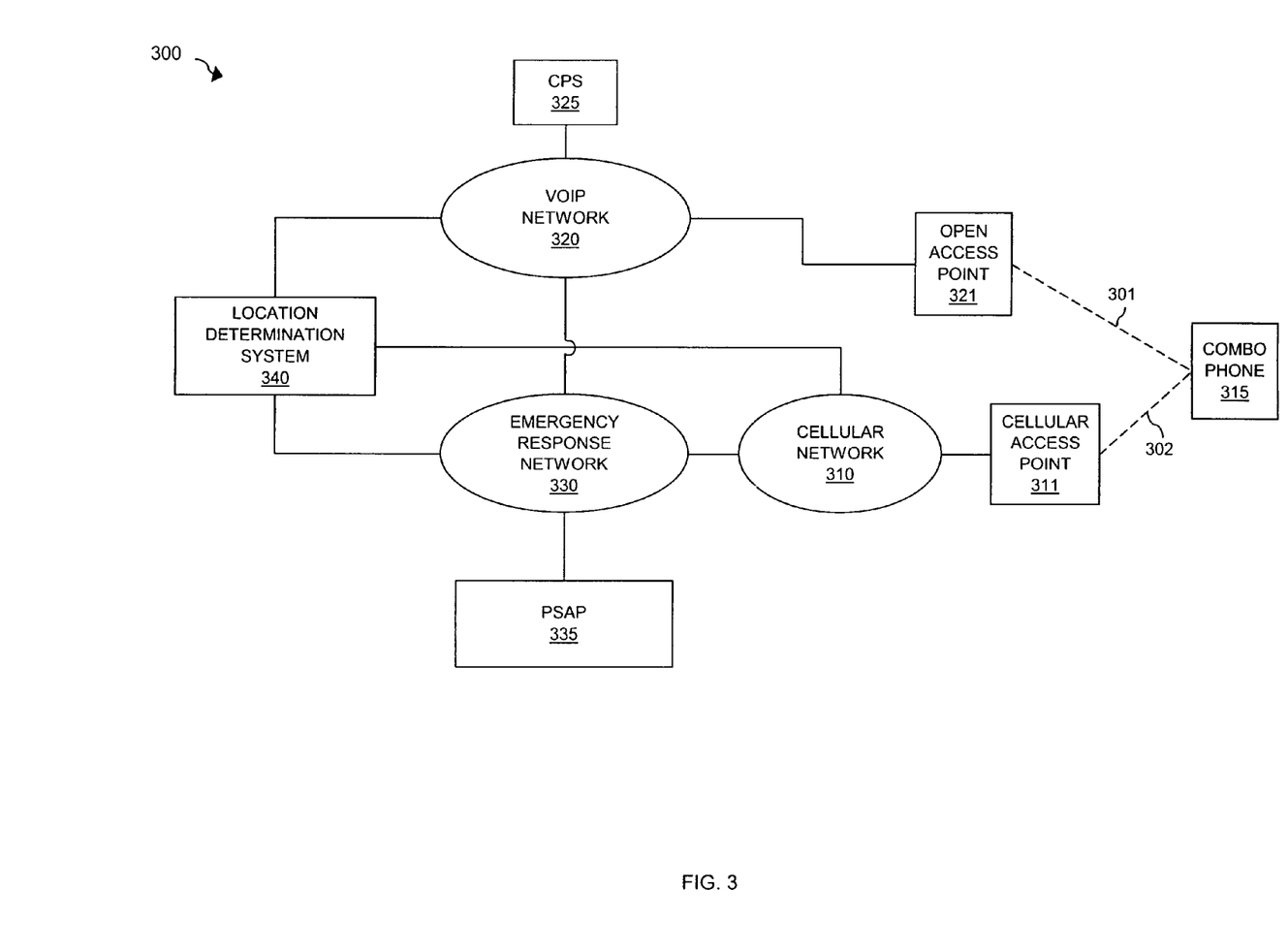
FIG. 3 illustrates a communication network in an embodiment of the invention.

FIG. 3 illustrates communication network 300 in an embodiment of the invention. Communication network 300 includes combo phone 315 in communication with open access point 321 over open access link 301. Combo phone 315 is also in communication with cellular access point 311 over cellular access link 302. Access links 301 and 302 could be wireless links. Open access point 321 is operatively coupled to Voice Over Internet Protocol (VOIP) network 320, which includes call processing system (CPS) 325. Open access point 321 could be, for example, a WiFi or WiMax access point, as well as other types of open access points. Cellular access point 311 is operatively coupled to cellular network 310. VOIP network 320 is operatively coupled to emergency response network 330 and location determination system 340. Similarly, cellular network 310 is operatively coupled to emergency response network 330 and location determination system 340. Emergency response network 330 is operatively coupled to public safety answering point (PSAP) 335 and location determination system 340.

Combo phone 315 could be any system or collection of systems capable operating in multiple modes. In an open access mode, combo phone 315 could be capable of placing voice calls over VOIP network 320. In a cellular access mode, combo phone 315 could be capable of placing calls over cellular network 310. Open access point 321 could be any access system capable of interfacing between combo phone 315 and VOIP network 320. In an example, open access point 321 could comprise a Wi-Fi base station or modem or a Wi-Max base station transceiver. Link 301 could comprise a Wi-Fi or Wi-Max wireless link. Cellular access point 311 could be any access system capable of interfacing between combo phone 315 and cellular network 310. In an example, cellular access point 311 could be a cellular base station or tower. In another example, link 302 could comprise a code division multiple access (CDMA) link or a general service mobile (GSM) link, as well as other types of links. Combo phone 315 could also be referred to as a dual mode phone, handset, subscriber terminal, communication device, or the like. Combo phone 315 could include an interface system for receiving user inputs, as well as for interfacing with open access point 321 and cellular access point 311. Combo phone 315 could also include a processing system capable of executing software to operate as described or FIGS. 4-6 below. It should be appreciated that the processing system could be implemented general purpose hardware, firmware, or specialized circuitry. It should also be appreciated that combo phones, as well as other types of call systems, are well known in the art.

VOIP network 320 could be any service network capable of providing call services to combo phone 315 through open access point 321. In addition, VOIP network 320 could be any service network capable of terminating emergency service calls from combo phone 315 to emergency response network 330. VOIP network 320 could also be capable of interfacing with location determination system 340 to provide the geographic location of combo phone 315 to emergency response network 330, an in turn, PSAP 335. CPS 325 could be any system or collection of systems capable of providing call processing for calls in VOIP network 320. For example, CPS 325 could provide call origination, termination, or forwarding services. Other services include call discrimination functions. In an example, CPS 325 could comprise a session initiation protocol (SIP) server or H.323 server.

Likewise, cellular network 310 could be any network capable of providing call services to combo phone 315 through cellular access point 311. In addition, cellular network 310 could be capable of terminating emergency service calls from combo phone 315 to emergency response network 330. Cellular network 310 could also be capable of interfacing with location determination system 340 to determine and provide the geographic location of combo phone 315 to emergency response network 330 and PSAP 335.

It should be understood that VOIP network 320 and cellular network 310 could operate separately to terminate emergency service calls to emergency response network 330. However, VOIP network 320 and cellular network 310 could operate in a tandem or cooperative manner to handle emergency service calls.

Emergency response network 330 could be any network or collection of networks capable of interfacing with VOIP network 320 and cellular network 310 to terminate emergency service calls to PSAP 335. In addition, emergency response network 330 could be capable of interfacing with location determination system 340 to provide the geographic location of combo phone 315 to PSAP 335. Location determination system 340 could be any system or collection of systems capable of determining the geographic location of a call.

Figure 4:
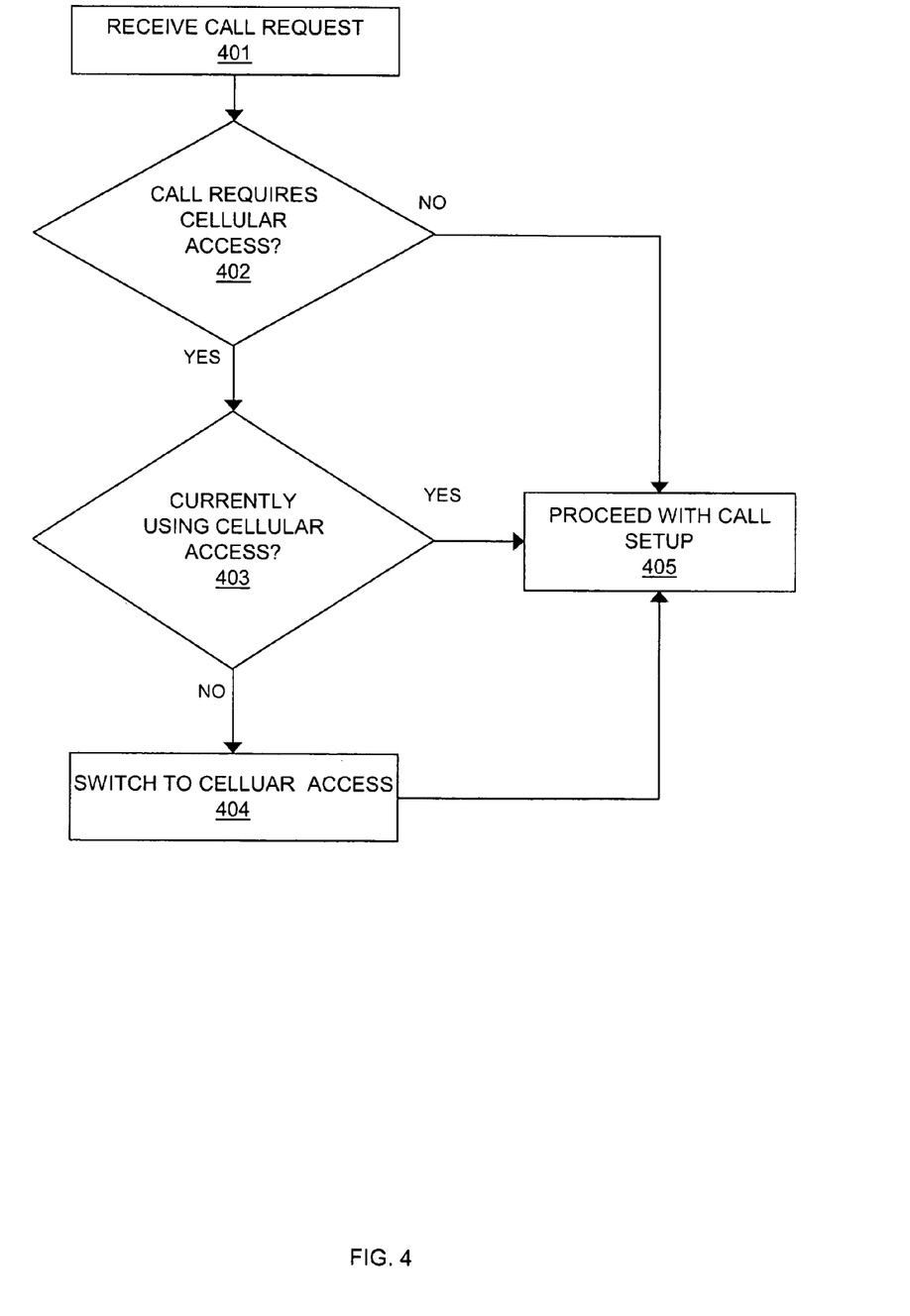
FIG. 4 illustrates the operation of a call system in an embodiment of the invention.

FIG. 4 illustrates the operation of combo phone 315 in an embodiment of the invention. To begin, combo phone 315 receives a call request for a call while operating in a current mode of either the open access mode or the cellular access mode (Step 401). The call request could be, for example, a user input. Examples of user inputs include dialed numbers, graphic selections, quick buttons, or the like.

Continuing with FIG. 4, combo phone 315 processes the call request to determine if the call is an emergency service call and requires cellular access (Step 402). Whether a call is an emergency service call could be indicated in the call request, such as by a digit string. An example is 911. An emergency service could also be indicated by other dialed numbers, such as a 7 or 10 digit dialing code, as well as by graphic selections, quick buttons, or the like.

If the call is an emergency service call, combo phone 315 determines whether or not the current mode is the cellular access mode (Step 403). If the current mode is cellular, combo phone 315 proceeds with call setup for the call while operating in the cellular mode (Step 405), including initiating the call to cellular network 310. If the current mode is not the cellular mode, combo phone 315 changes the current mode of operation to the cellular mode (Step 404) and then initiates the call in the cellular mode (Step 405).

Once the call has been initiated from combo phone 315, cellular network 310 routes the call to emergency response network 330. Cellular network 310 communicates with location determination system 340 to provide the geographic location of combo phone 315 to emergency response network 330. In response, emergency response network 330 selects the appropriate PSAP for the call, which in this example is illustrated as PSAP 335, and routes the all to the selected PSAP. In addition, geographic location information is provided to PSAP 335 for combo phone 315. It should be understood that the geographic location information could be a key used by PSAP 335 to query location determination system 340 for the actual geographic information for a particular call. Other variations of providing location information to PSAP 335 are possible.

Figure 5:
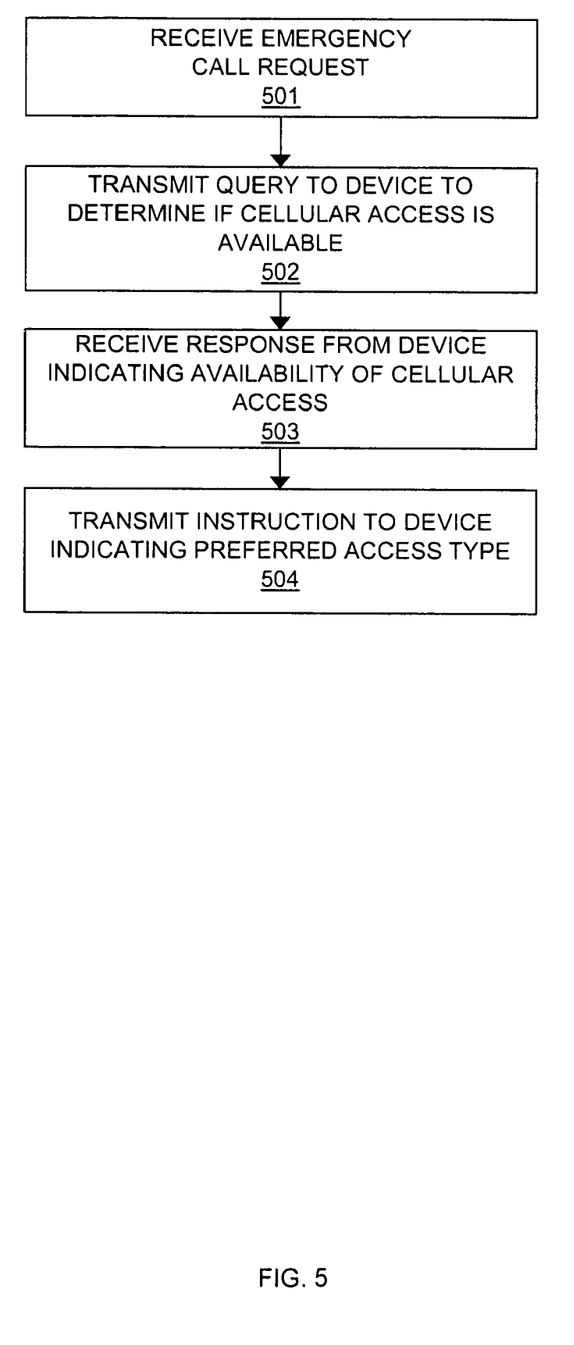
FIG. 5 illustrates the operation of a call processing system in an embodiment of the invention.

FIG. 5 illustrates the operation of a CPS 325 in an embodiment of the invention. In this embodiment, it is assumed that the current mode of combo phone 315 is an open access mode and it is also assumed that combo phone 315 interfaces with VOIP network 320 and CPS 325 to establish voice calls. It should be understood that combo phone 315 communications with VOIP network 320 and CPS 325 over open access point 321.

In this embodiment, CPS 325 receives a call request from combo phone 315 (Step 501). The call request could indicate a service, such as by a digit string, phone number, or other such identifier. The call request could be, for example, a SIP INVITE message. CPS 325 processes the call request to determine whether or not the call is for an emergency service. If the call is for an emergency service, such as 911, CPS 325 transmits a query to combo phone 315 requesting information regarding the availability of cellular access (Step 502). Combo phone 315 responsively determines whether or not cellular access is presently available and returns a response indicating the result, which is received by CPS 325 (Step 503). Based upon the result, CPS 325 determines a preferred access mode for the emergency service call and transmits a response to combo phone 315 indicating the preferred mode (Step 504).

It should be appreciated that, if cellular access is not available at the time of the call, CPS 325 could instruct combo phone 315 to remain in the open access mode for the call. Alternatively, if cellular access is available for the call, CPS 325 could instruct combo phone 315 to switch to the cellular access. In such a case, CPS 325 could initiate a call hand-off to cellular network 310 in the event that an initial call leg has already been established to VOIP network 320. Optionally, CPS 325 could instruct combo phone 315 to end the current call session and initiate a new emergency service call to cellular network 310. In a further option, CPS 325 could query a device in cellular network 310 or emergency response network 330 to confirm whether or not the new emergency service call is eventually initiated and established. In a successful case CPS 325 could continue normal operations without modification. In an unsuccessful case whereby the new emergency service call fails to be initiated or established, CPS 325 could itself initiate a call-back to combo phone 315. Upon establishing the first call-back call leg through VOIP network 320 to combo phone 315, CPS 325 establish a second call leg from VOIP network 320 to emergency response network 330, and in turn, to PSAP 335.

Figure 6:
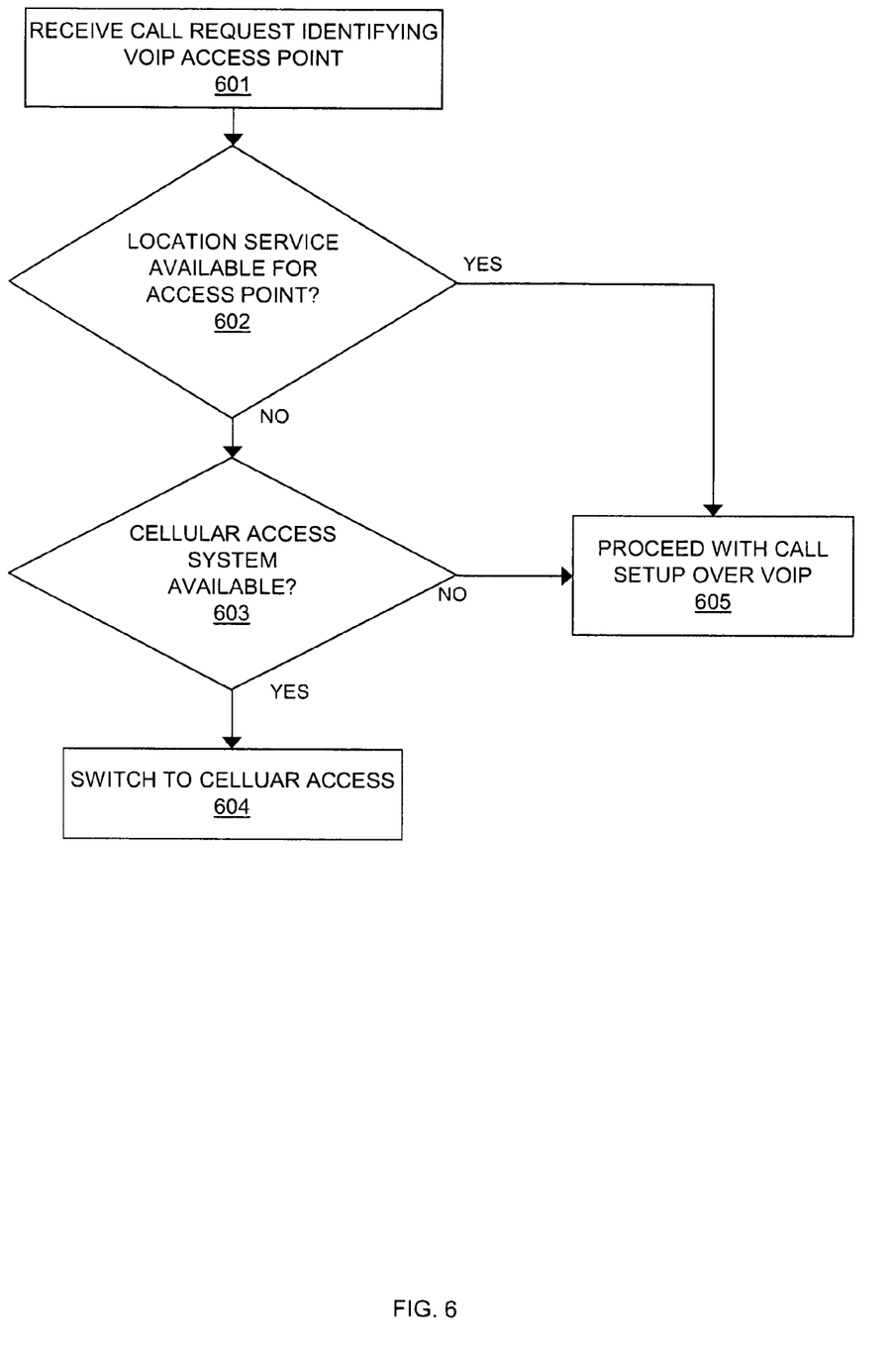
FIG. 6 illustrates the operation of a call processing system in an embodiment of the invention.

FIG. 6 illustrates the operation of CPS 325 in an embodiment. In this embodiment, it is assumed that the current mode of combo phone 315 is an open access mode or VOIP mode and that combo phone 315 interfaces with VOIP network 320 and CPS 325 to establish voice calls. It should be understood that combo phone 315 communications with VOIP network 320 and CPS 325 over open access point 321.

Turning to FIG. 6, CPS 325 receives a call request, such as a SIP INVITE message, from combo phone 315 (Step 601). In this embodiment, the call request identifies open access point 321. It should be understood that multiple access points could exist, and therefore the call request could uniquely identify open access point 321. It should further be understood that combo phone 315 could move or roam between multiple access points, and therefore CPS 325 could determine the present access point dynamically at the time of the call. Open access point 321 could be identified by a label, a network address, a media access control (MAC) address, or the like.

CPS 325 responsively processes the identity of access point 321 to determine if location services are available for that particular access point (Step 602). For example, the geographic location of some access points could be pre-provisioned in location determination system 340, while other access points may not be registered. In one example, CPS 325 queries location determination system 340 to determine if location services are available for open access point 321.

If location services are available for open access point 321, CPS 325 instructs combo phone 315 to proceed with the call in VOIP mode (Step 605). If location services are not available for open access point 321, CPS 325 queries combo phone 315 as to the availability of cellular access (Step 603). If cellular access is not available, CPS 325 instructs combo phone 315 to proceed with the call in VOIP mode (Step 605). If cellular access is available, CPS 325 instructs combo phone 315 to switch to cellular access and place a new emergency service call over cellular access point 311 to cellular network 310. It should be understood that CPS 325 could initiate a call hand-off to cellular network 310 in the event that an initial call leg has already been established to VOIP network 320. Optionally, CPS 325 could instruct combo phone 315 to end the current call session and initiate a new emergency service call to cellular network 310. In a further option, CPS 325 could query a device in cellular network 310 or emergency response network 330 to confirm whether or not the new emergency service call is eventually initiated and established. In a successful case CPS 325 could continue normal operations without modification. In an unsuccessful case whereby the new emergency service call fails to be initiated or established, CPS 325 could itself initiate a call-back to combo phone 315. Upon establishing the first call-back call leg through VOIP network 320 to combo phone 315, CPS 325 establish a second call leg from VOIP network 320 to emergency response network 330, and in turn, to PSAP 335.

Advantageously, communication network 300 provides for a call system determining a preferred access mode of operation for an emergency service call rather than placing the call over in a default of current mode when the current mode could be deficient. In this manner, user can enjoy high quality emergency call services, such as location determination services, without the burden of manually changing the mode of operation of a call system.

What is claimed is:

1. A call system comprising:
a communication device configured to operate in a plurality of modes; and
a call processing system configured to receive a call request transferred from the communication device over a communication network while the communication device is in a current mode and, in response to receiving the call request:
to determine an availability of location services for each of the plurality of modes including determining if a location of an access point associated with at least one of the plurality of modes is known, to determine if the call is for an emergency service while in the current mode, if the call is for the emergency service determine a preferred mode for the call from the plurality of modes based on at least the availability of the location services for each of the plurality of modes, and to transfer instructions to the communication device to initiate the call in the preferred mode.

2. The call system of claim 1 wherein the communication device is configured to change the current mode to the preferred mode if the current mode is not the preferred mode.

3. The call system of claim 1 wherein the call processing system is configured to determine if the preferred mode is available and wherein the communication device is configured to remain in the current mode and initiate the call in the current mode if the preferred mode is not available.

4. The call system of claim 1 wherein the emergency service comprises 911 service.

5. The call system of claim 1 wherein the plurality of modes comprises an open access mode and a dedicated access mode.

6. The call system of claim 5 wherein the open access mode comprises a Wi-fi mode.

7. The call system of claim 6 wherein the dedicated access mode comprises a cellular access mode.

8. The call system of claim 7 wherein the cellular access mode comprises a code division multiple access (CDMA) mode.

9. The call system of claim 7 wherein the cellular access mode comprises a global service mobile (GSM) access mode.

10. A method of operating a call processing system, the method comprising:
    receiving a call request from a communication device over a communication network while the communication device is in a current mode of a plurality of modes;
    in response to receiving the call request:
        determining an availability of location services for each of the plurality of modes including determining if a location of an access point associated with at least one of the plurality of modes is known;
        determining if the call is for an emergency service while in the current mode;
        if the call is for the emergency service determining a preferred mode for the call from the plurality of modes based on at least the availability of location services; and
        transferring instructions to the communication device directing the communication device to initiate the call in the preferred mode.

11. The method of claim 10 further comprising the communication device changing the current mode to the preferred mode if the current mode is not the preferred mode.

12. The method of claim 10 further comprising determining if the preferred mode is available, and transferring instructions to the communication device directing the communication device to remain in the current mode and initiate the call in the current mode if the preferred mode is not available.

13. The method of claim 10 wherein the emergency service comprises 911 service.

14. The method of claim 10 wherein the plurality of modes comprises an open access mode and a dedicated access mode.

15. The method of claim 14 wherein the open access mode comprises a Wi-fi mode.

16. The method of claim 15 wherein the dedicated access mode comprises a cellular access mode.

17. The method of claim 16 wherein the cellular access mode comprises a code division multiple access (CDMA) mode.

18. The method of claim 16 wherein the cellular access mode comprises a global service mobile (GSM) access mode.

19. The call system of claim 1 wherein the communication device is configured to determine if the preferred mode is available and wherein the communication device is configured to remain in the current mode and initiate the call in the current mode if the preferred mode is not available.

20. The method of claim 10 further comprising the communication device determining if the preferred mode is available, and remaining in the current mode and initiating the call in the current mode if the preferred mode is not available.

21. The call system of claim 1 wherein the call processing system is further configured to:
    determine if the communication device successfully establishes the call in the preferred mode; and
    transfer instructions to the communication device to initiate the call in a mode other than the preferred mode if the communication device does not successfully establish the call in the preferred mode.

22. The method of claim 10 further comprising:
    determining if the communication device successfully establishes the call in the preferred mode; and
    transferring instructions to the communication device to initiate the call in a mode other than the preferred mode if the communication device does not successfully establish the call in the preferred mode.

* * * * *